US006865696B2

(12) United States Patent
Lopke

(10) Patent No.: US 6,865,696 B2
(45) Date of Patent: Mar. 8, 2005

(54) ENDUSER DIAGNOSTIC SYSTEM AND METHOD FOR COMPUTER-BASED ERROR INTERPRETATION

(75) Inventor: Michael S. Lopke, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 453 days.

(21) Appl. No.: 09/882,567

(22) Filed: Jun. 15, 2001

(65) Prior Publication Data

US 2002/0194550 A1 Dec. 19, 2002

(51) Int. Cl.[7] ................................................ G06F 11/00
(52) U.S. Cl. ........................... 714/48; 714/26; 714/31; 714/25
(58) Field of Search ........................ 714/48, 26, 46, 714/25, 43, 31; 706/45

(56) References Cited

U.S. PATENT DOCUMENTS

| | | | |
|---|---|---|---|
| 5,483,637 A | | 1/1996 | Winokur et al. |
| 5,941,996 A | * | 8/1999 | Smith et al. ................... 714/47 |
| 6,026,500 A | * | 2/2000 | Topff et al. ..................... 714/26 |
| 6,065,136 A | * | 5/2000 | Kuwabara ....................... 714/31 |
| 6,145,096 A | | 11/2000 | Bereiter et al. |
| 6,178,528 B1 | * | 1/2001 | Poisner .......................... 714/48 |
| 6,260,048 B1 | * | 7/2001 | Carpenter et al. ......... 707/104.1 |
| 6,298,457 B1 | * | 10/2001 | Rachlin et al. ................ 714/49 |
| 6,516,427 B1 | * | 2/2003 | Keyes et al. ................... 714/25 |
| 6,539,499 B1 | * | 3/2003 | Stedman et al. ............... 714/40 |
| 6,601,190 B1 | * | 7/2003 | Meyer et al. .................. 714/37 |
| 6,628,417 B1 | * | 9/2003 | Naito et al. ................. 358/1.15 |
| 6,742,141 B1 | * | 5/2004 | Miller ........................... 714/26 |
| 2002/0144187 A1 | * | 10/2002 | Morgan et al. ................ 714/43 |
| 2002/0162056 A1 | * | 10/2002 | Forman et al. ................ 714/46 |
| 2002/0184118 A1 | * | 12/2002 | Gronemeyer et al. ......... 705/28 |

FOREIGN PATENT DOCUMENTS

| | | |
|---|---|---|
| GB | 2338805 | 12/1999 |
| WO | WO00/68793 | 11/2000 |
| WO | WO01/39042 | 5/2001 |

* cited by examiner

Primary Examiner—Robert Beausoliel
Assistant Examiner—Yolanda Wilson

(57) ABSTRACT

An enduser diagnostic system or "system" (10) for computer-based error interpretation includes a network addressable device (33), a computer-based system (20), and an inspector (40). The network addressable device (33) provides solutions for error problems associated with the computer-based system (20). The computer-based system (20) includes a system registry (26) for storing information required for configuring software and hardware components that define the computer-based system (20). The inspector (40) is a software component linked with the system registry (26) and the network addressable device (33). The inspector (40) compiles examination data by accessing the computer-based system (20) including the system registry (26). By generating examination data, the inspector (40) quickly and accurately provides information, including real-time information, required for assisting the network addressable device (33) with supplying a solution to the error.

17 Claims, 3 Drawing Sheets

ENDUSER DIAGNOSTIC SYSTEM AND METHOD FOR COMPUTER-BASED ERROR INTERPRETATION

FIELD OF THE INVENTION

This invention relates to a computer-based system and method for diagnosing system errors. More particularly, this invention relates to expeditiously identifying errors associated with computer-based systems via system status confirmation implemented by an inspector prior to forwarding that error problem for resolution.

BACKGROUND OF THE INVENTION

A business customer support service center provides assistance with solving problems that a consumer or "enduser" may have with a product or service purchased from that business. Because most consumer problems are often unique, customer support must accurately account for consumer information. Consumer information pertains to information relating to the products and services purchased by each consumer. For example, an accurate accounting of warranty information, potential product upgrades and recalls, and past consumer problems are some examples of important types of information needed by consumer support to provide optimal assistance.

With the continuing expansion of commerce conducted on the Internet, many business customer support centers provide consumer assistance through a network addressable device, i.e. a Uniform Resource Locator (URL) or, commonly, a "website". As shown in FIG. 2, a typical prior art website includes a support resources component and a database component linked with the support resources component. Typically, the support resources component includes support personnel skilled in public relations as well as in technical expertise of the product or service at issue. The database component includes enduser records including consumer information and libraries of detailed product or service specifications provided by the business.

Illustratively, consider a customer having a problem with their computer-based system, such as a printer at a desktop computer workstation. The customer requests assistance for the problem by accessing the network addressable device. The network addressable device is accessed through a browser connected to the workstation. The problem is received by the support resources component. Typically, in preparation for deriving a solution, the support resources component communicates with the consumer to distill key concepts associated with the problem. The support resources component often references the database component so as to derive an optimal solution for the printer problem.

Unfortunately, the process of distilling key concepts as well as referencing the database component is excessively labor and time intensive for the support resources component. It often requires a great effort for support resources to distill key concepts. One reason is that customers accessing the customer support center often lack the knowledge to identify technical problems associated with their computer-based system. Moreover, because problem requests are addressed in the order that they are received, support resources cannot invest too much time with one customer at the expense of others.

Thus, as a matter of saving cost, labor, and time, there is a need in the art for providing a system and method for expeditiously identifying errors associated with computer-based systems prior to forwarding that error problem for resolution thereof.

SHORT STATEMENT OF THE INVENTION

Accordingly, an enduser diagnostic system or "system" for computer-based error interpretation includes a network addressable device, a computer-based system, and an inspector. The network addressable device provides solutions for error problems associated with the computer-based system. The computer-based system includes a system registry for storing information required for configuring software and hardware components that define the computer-based system.

The inspector is a software component linked with the system registry and the network addressable device. The inspector compiles examination data by accessing the computer-based system including the system registry. By generating examination data, the inspector quickly and accurately provides information, including real-time information, required for assisting the network addressable device with a solution to the error.

In part, the examination data enables the inspector to accurately convey error problems associated with the computer-based system with minimal or no interfacing with the enduser, to the benefit of endusers lacking technical knowledge. However, as a safeguard against inappropriate dissemination of information from the computer-based system, the inspector displays the examination data for approval by an enduser having the error problem prior to sending that examination data to the network addressable device. As a further safeguard, the inspector may permit the enduser to edit the examination data prior to transmission to the network addressable device.

In a further embodiment of the present invention, a method for computer-based error interpretation includes engaging an inspector with a computer-based system. After generating examination data associated with the computer-based system, the inspector sends only examination data approved by an enduser to a network addressable device. The network addressable device based on the examination data derives a solution for errors associated with the computer-based system. Optionally, the network addressable device may prompt the inspector to store derived solutions for future reference.

BRIEF DESCRIPTION OF THE DRAWINGS

Other objects, features, and advantages of the present invention will become more fully apparent from the following detailed description of the preferred embodiments, the appended claims and the accompanying drawings in which:

DETAILED DESCRIPTION OF THE PREFERRED EMBODIMENTS

Figure 1:
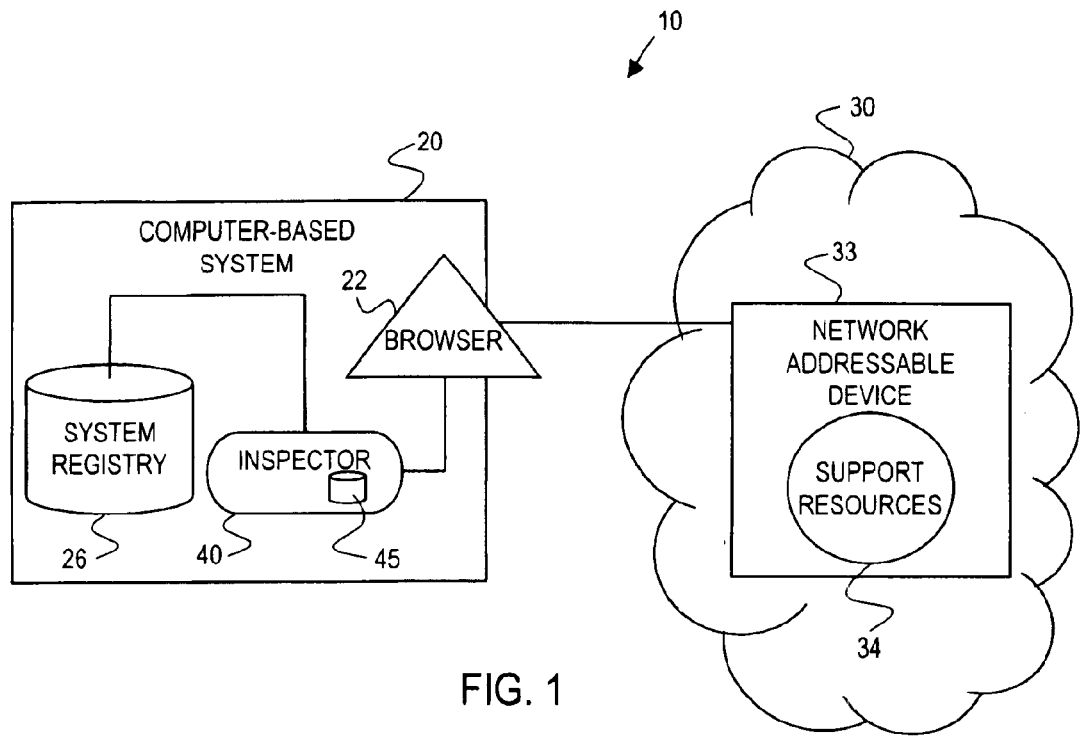
FIG. 1 is a schematic diagram of a preferred embodiment of a diagnostic system of the present invention for providing computer-based error interpretation via an inspector.
Figure 2:
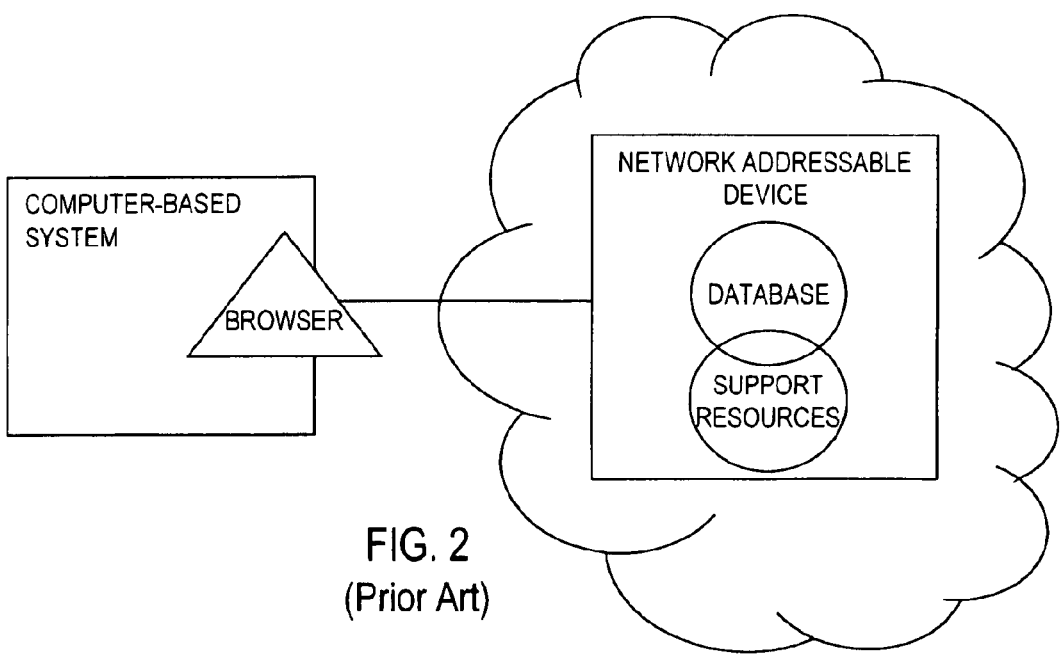
FIG. 2 is a schematic diagram illustrating a prior art system for providing error interpretation.
Figure 3:
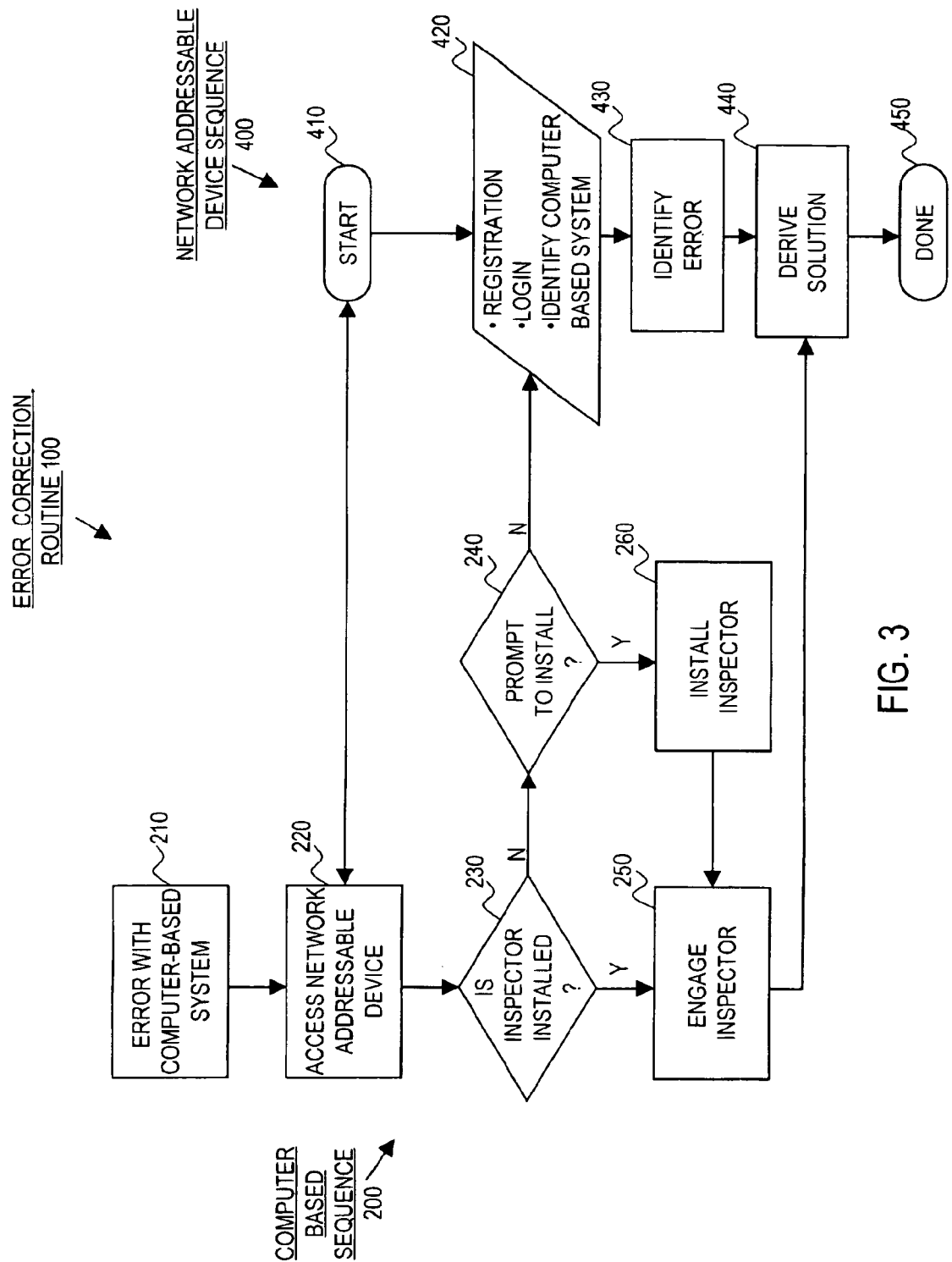
FIG. 3 is a flow diagram illustrating an error correction routine provided by the system of FIG. 1 featuring a computer-based system sequence as well as a network addressable device sequence.
Figure 4:
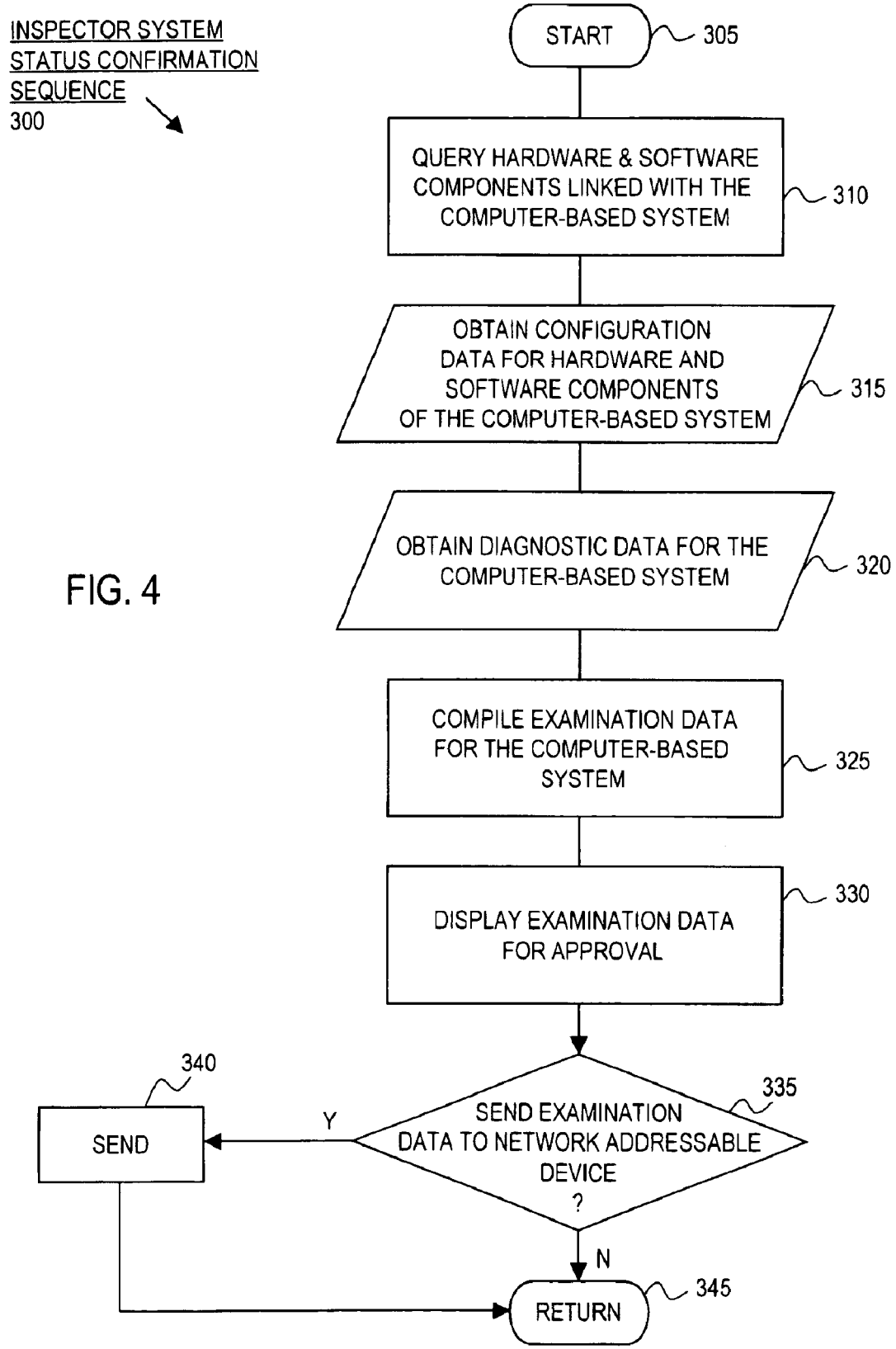
FIG. 4 is a flow diagram illustrating a system status confirmation sequence implemented by the inspector of FIG. 1.

The preferred embodiments of the present invention are illustrated by way of example in FIGS. 1, 3, and 4. With specific reference to FIG. 1, an enduser diagnostic system 10 (hereinafter "system") includes a computer-based system 20 and network addressable device 33. The system 10 further includes an inspector 40 linked with the computer-based system 20 and the network addressable device 33.

In general, for an error encountered by the computer-based system 20, the network addressable device 33 resolves that error. Prior to forwarding an error to the network addressable device 33, the inspector 40 implements a system status confirmation sequence 300 (See FIG. 4). As such, the inspector 40 expeditiously identifies errors associated with the computer-based system 20.

Specifically, the network addressable device 33 is configured for engagement with a communications network 30. The communication network 30 is of a type well known in the industry. Accordingly, in a preferred embodiment, the communications network 30 comprises an Internet communications network environment but other embodiments contemplate an intranet communications environment. The network addressable device 33 is a location within the communications network 30, such as an Internet address or Uniform Resource Locator (URL) for example. Ultimately, the network addressable device 33 is a tool for resolving error problems with the computer-based system 20.

The network addressable device 33 includes a support resources component 34. The support resources component is linked with the inspector 40. The support resources component 34 includes personnel skilled in solving error problems associated with the computer-based system 20. In operation, regardless of the inspector 40, the network addressable device 33 of the present invention supplies error problem solutions to endusers. However, by quickly and accurately providing information required for supplying a solution to an error, an inspector 40 optimally assists the network addressable device 33 with problem solving.

Illustratively, consider a customer having a problem with their computer-based system, such as a printer at a desktop computer workstation. The customer requests assistance for the problem by accessing the network addressable device 33. The problem is received by the support resources component 34 for assistance in error resolution.

The computer-based system 20 is defined by hardware and software components capable, in combination, of executing applications and instructions as dictated by a machine-readable code. Examples of computer-based systems include, but are not limited to, a desktop computer workstation, a laptop computer, a wireless device, such as a MOTOROLA SKYTEL pager or PALM PILOT or an Internet appliance, such as Microsoft's WEBTV or a personal Internet appliance such as COMPAQ's IPAQ.

Still referring to FIG. 1, the computer-based system 20 includes a system registry 26. The system registry 26 stores information required for configuring software and hardware components that define the computer-based system 20. Properly configured hardware and software components are essential for successfully operating the computer-based system 20.

The computer-based system 20 may also include a browser 22. Preferably, as shown in FIG. 1, the computer-based system 20 accesses the network addressable device 33 through a browser 22. The browser 22 facilitates enduser access through a graphical format. The browser 22 is of a type well known in the art, such as NETSCAPE NAVIGATOR or MICROSOFT EXPLORER for example. Other embodiments of the system 10, however, do not use a browser 22 for accessing the network addressable device 33.

The inspector 40 is a software component linked with the computer-based system 20 and the network addressable device 33. In one preferred embodiment, the inspector 40 comprises a plugin integrated with the browser 22. In this disclosure and appended claims, a plugin is defined as application software for extending a browser's functionality as is known in the art. The inspector 40 is downloaded from the network addressable device 33 to the computer-based system 20, in a preferred embodiment, as a plugin.

The plugin embodiment of the inspector 40 contains code components in a language that accommodates specialized applications, such as JAVA or Microsoft Corporation's ACTIVE X. The code components preferably integrate with an operating system for the computer-based system 20. In operation, by accessing information directly from the computer-based system 20, the inspector 40 implements error correction routine 100 (See FIG. 3) for generating and sending examination data to the network addressable device 33.

Alternatively, in another preferred embodiment, the inspector 40 is an individual software component linked with the computer-based system 20. The individual software component embodiment of the inspector 40 is either obtained as factory-installed software for the computer-based system 20 or installed from storage media, such as a CD-ROM or other digital recording media.

As shown in FIG. 1, the inspector 40 is linked with the system registry 26. The inspector 40 obtains configuration data from the registry 26. Configuration data refers to information required for configuring software and hardware components that define the computer system 20. Preferably, the inspector 40 obtains configuration data reflecting real-time configuration information.

The inspector 40 further includes a repository 45. The inspector 40 obtains diagnostic data from the repository 45. Diagnostic data refers to auxiliary information relating to the computer-based system 20.

Specifically, for example, diagnostic data includes past solutions to error problems that are related to the computer-based system 20. In the preferred embodiment, solutions to error problems are sent from the network addressable device 33 for storage in the repository 45 and retrieval by the inspector 40.

Diagnostic data may also include warranty and version upgrade information associated with software and hardware components that define the computer system 20. Preferably, as a component of diagnostic data, the inspector 40 obtains warranty and version upgrade data information by accessing the system registry 26. It may be that such data, i.e. the warranty data, is not on the registry 26 itself but that a key, i.e. a serial number or a product number or the like, is. The key is then used to reference the data that is on another data base on the server itself, for example. Many other variations are possible to those of ordinary skill.

From the configuration data and the diagnostic data, the inspector 40 compiles examination data. For the purposes of the invention, examination data refers to information for assisting in the resolution of a computer-based system error problem. The inspector 40 generates examination data by selecting information required by the network addressable device 33 from the configuration data and the diagnostic data. In one preferred embodiment, the inspector 40 executes a program routine for selecting information required by the network addressable device 33. Alternatively, in another preferred embodiment, the network addressable device 33 directly selects the information required for generating examination data by interacting with the inspector 40.

Once generated, the inspector 40 displays the examination data via the computer-based system 20 to the enduser prior to sending the examination data to the network addressable device 33. Preferably, to safeguard against inappropriate dissemination of information from the computer-based system 20, the inspector 40 displays the examination data for approval by the enduser with the error problem. As a further safeguard, the inspector 40 may permit the enduser to edit the examination data prior to transmission from the computer-based system 20 to the network addressable device 33.

With enduser approval, the inspector 40 sends the examination data to the network addressable device 33. That is, in a preferred embodiment, the network addressable device 33 receives only the examination data approved by the enduser. Further, in deriving a solution to the error, the support resources component 34 reviews the examination data.

Once solved by the support resources component 34, the solution to the error is preferably sent from the support resources component 34 to the repository 45. The enduser and the system 10 then act in accordance with the solution. In addition, the solution is stored by the repository 45 for future access by the inspector 40. The inspector 40 may then obtain the solution from the repository 45 as a component of diagnostic data for another error associated with the computer-based system 20.

In operation, error correction routine 100 provides solutions to errors associated with the computer-based system 20. FIG. 3 outlines the error correction routine 100 implemented by the system 10. Reflecting the operative interaction between the computer-based system 20 and the network addressable device 33, the error correction routine 100 is divided to include a computer-based sequence 200 and a network addressable device sequence 400. The computer-based sequence 200, steps 210–260 of the error correction routine 100, outlines the manner for presenting an error associated with the computer-based system 20 to the network addressable device 33. On the other hand, the network addressable device sequence 400, steps 410–450 of the error correction routine 100, outlines the manner for supplying a solution to an error from the computer-based system 20.

For purposes of illustration, consider the manner for supplying a solution to an error via the error correction routine 100. In step 410, the computer-based system 20 starts by accessing the network addressable device 33. The network addressable device 33 in step 420 identifies the proper enduser and computer-based system submitting the error. Preferably, by interfacing with the enduser, step 420 requires that the enduser register with the network addressable device 33 as well as requiring that the enduser login and identify the particular computer-based system in error.

In step 430, the support resources component 34 identifies the error associated with the computer-based system 20. As mentioned above, the support resources component 34 may interface with the enduser to identify the error. It should be added that the network addressable device 33 executes steps 420 and 430 as a default for computer-based systems that do not include an inspector 40. Thus, based on an enduser's comfort level with allowing the inspector 40 to probe the computer-based system 20 to identify errors, an enduser preferably has the option not to include the inspector 40 and to directly interface with the network addressable device 33 as a default. However, including the inspector 40 significantly enhances the speed and accuracy of identifying errors associated with computer-based systems. In step 440, the network addressable device 33 derives a solution for the error before ending error correction routine 100 in step 450.

From the point of view of a computer-based system 20 enduser, the computer-based sequence 200 begins with step 210. In step 210, the computer-based system 20 encounters an error. In step 220, the computer-based system 20 accesses the network addressable device 33 to resolve the error. Additionally, as shown in FIG. 3, step 220 initiates the network addressable device sequence 400 beginning with step 410 as described above.

The computer-based sequence 200 advances from step 220 to step 230. In step 230, as a prompt from the network addressable device 33, the computer-based system 20 queries whether the inspector 40 is linked with the computer-based system 20. If an inspector 40 is not integrated, the computer-based system 20 in step 240 interfaces with the enduser to determine whether an inspector 40 should be integrated with the computer-based system 20. If inspector 40 integration is not desired, the computer-based system 20 enduser interfaces with the support resources component 34 as described in steps 430 and 440. Alternatively, if inspector 40 integration is desired, the inspector 40 is installed in step 260.

Once integrated with the computer-based system 20, the inspector 40 is engaged in step 250. Prior to forwarding the error for resolution by the network addressable device 33 in step 440, the inspector 40 expeditiously identifies errors associated with computer-based systems 20 via an inspector system status confirmation sequence 300 of FIG. 4. In effect, by generating examination data, the inspector 40 quickly and accurately provides information required for assisting the network addressable device 33 with supplying a solution to the error.

As shown in FIG. 4, the inspector system status confirmation sequence 300 is initiated in step 305. In step 310, the inspector 40 accesses hardware and software components defining the computer-based system 20 so as to ultimately generate examination data. In step 315, the inspector 40 interfaces with the system registry 26 to obtain configuration data. Similarly, the inspector 40 in step 320 obtains diagnostic data from the system registry 26 as well as the repository 45.

By selecting relevant information from the diagnostic data and the configuration data, the inspector 40 in step 325 generates examination data. The examination data is displayed to the enduser by the computer-based system 20 in step 330. In step 335, the inspector 40 prompts the enduser for approval of the examination data prior to transmission to the network addressable device 33. If approved, the inspector 40 in step 340 sends the examination data to the network addressable device 33 prior to completing the inspector system status confirmation sequence 300 in step 345.

Illustratively, consider the computer-based system 20 as a desktop computer encountering an error associated with operating a printer such as when an updated version of a printer driver is required. Due to the printer error, an enduser accesses the network addressable device 33 from the desktop computer. Prompted by the network addressable device 33, an error correction routine 100 executed by the desktop computer determines whether an inspector is linked with that desktop computer. If an inspector is not installed, the desktop computer queries the enduser whether an inspector is desired. Ultimately, an inspector expedites the network addressable devices' 33 ability to provide a solution for the printer error. As outlined in steps 420–430 of the network addressable device sequence 400, the network addressable device 33 interfaces with the enduser to identify the error associated with the printer if an inspector is not desired.

If desired, an inspector 40 is installed and engaged with the desktop computer. Once connected to the desktop computer, the inspector 40 interfaces with a system registry 26 of the desktop computer to obtain real-time configuration data, including, for example, information associated with integrating the printer with the desktop computer. The inspector 40 also obtains diagnostic data from the system registry 26 as well as from a repository 45 provided by the inspector 40. From the configuration data and the diagnostic data, the inspector 40 generates examination data. Examination data is compiled by selecting information requested by the network addressable device 33. For example, the network addressable device 33 may request information such as a login associated with the enduser presenting the error, real-time information required for linking the printer and the desktop computer as well as warranty and update information for the desktop computer and the printer.

The inspector 40 displays the examination data on a desktop computer monitor for approval by the enduser prior to sending the examination data to the network addressable device 33. In sum, the inspector 40 provides the network addressable device 33 with quick and accurate information relating to the computer-based system 20 without the labor and time intensive task of extracting this information by interfacing with the enduser. Therefore, by assessing the examination data, the network addressable device 33 determines that the desktop computer needs to install an updated version of a printer driver for operating the printer. To solve the problem, the network addressable device 33 may then download the required printer driver to the computer-based system 20.

While the present invention has been disclosed in connection with the preferred embodiments thereof, it should be understood that there may be other embodiments which fall within the spirit and scope of the invention as defined by the following claims:

What is claimed is:

1. An enduser diagnostic system, comprising:
   (a) a network addressable device;
   (b) a computer-based system, the computer-based system including a system registry; and
   (c) an inspector linked with the system registry and the network addressable device wherein the inspector compiles examination data for the computer-based system, said examination data comprised of configuration data and diagnostic data of past solutions to error problems for said computer based system, and wherein the examination data is displayed by the computer-based system for user approval prior to connecting with the network addressable device.

2. The system according to claim 1 further comprising:
   (a) a browser linked to the network addressable device; and
   (b) wherein the inspector is linked with the browser.

3. The system according to claim 2 wherein the inspector comprises a plugin integrated with the browser.

4. The system according to claim 1 wherein the network addressable device includes:

(a) a support resources component; and
   (b) wherein the inspector is linked with the support resources component.

5. The system according to claim 1 wherein the inspector obtains configuration data associated with the computer-based system.

6. The system according to claim 1 wherein the inspector obtains diagnostic data associated with the computer-based system.

7. The system according to claim 1 wherein the inspector includes a repository; and
   (a) wherein the inspector stores diagnostic data in the repository.

8. The system according to claim 1 wherein only the examination data approved by the user is sent from the computer-based system to the network addressable device.

9. A method for computer-based error interpretation, comprising:
   (a) engaging an inspector linked with a computer-based system;
   (b) generating examination data associated with the computer-based system via the inspector, said examination data comprised of configuration data and diagnostic data of past solutions to error problems for said computer based system, wherein the examination data is displayed by the computer-based system for user approved prior to connecting with a network addressable device; and
   (c) sending the examination data to the network addressable device.

10. The method according to claim 9 further comprising the step of installing the inspector within the computer-based system.

11. The method according to claim 9 wherein the step of generating examination data for the computer-based system includes the step of obtaining configuration data associated with the computer-based system.

12. The method according to claim 11 wherein the step of obtaining configuration data includes the step of accessing a system registry provided by the computer-based system via the inspector.

13. The method according to claim 9 wherein the step of generating examination data for the computer-based system, further includes the step of obtaining diagnostic data associated with the computer-based system.

14. The method according to claim 9 wherein the step of displaying the examination data for user approval includes the step of editing the examination data for user approval.

15. The method according to claim 9 wherein the step of sending the examination data to the network addressable device, includes the step of sending only the examination data approved by the user from the computer-based system.

16. The method according to claim 9 further comprising the step of deriving a solution to the error with the network addressable device based on the examination data.

17. The method according to claim 16 wherein the step of deriving a solution includes the step of storing the solution to the error within a repository provided by the inspector.

* * * * *